(12) United States Patent
Kurosaki

(10) Patent No.: US 8,231,227 B2
(45) Date of Patent: Jul. 31, 2012

(54) LIGHT EMITTING DEVICE, LIGHT SOURCE UNIT AND PROJECTOR USING SAME LIGHT SOURCE UNIT

(75) Inventor: Hideyuki Kurosaki, Tachikawa (JP)

(73) Assignee: Casio Computer Co., Ltd., Tokyo (JP)

( * ) Notice: Subject to any disclaimer, the term of this patent is extended or adjusted under 35 U.S.C. 154(b) by 189 days.

(21) Appl. No.: 12/725,800

(22) Filed: Mar. 17, 2010

(65) Prior Publication Data

US 2010/0238412 A1    Sep. 23, 2010

(30) Foreign Application Priority Data

Mar. 17, 2009  (JP) ................. 2009-064916

(51) Int. Cl.
  *G03B 21/00*  (2006.01)
  *G03B 21/14*  (2006.01)
  *G03B 21/18*  (2006.01)
  *G03B 21/26*  (2006.01)
  *H04N 5/74*   (2006.01)
  *F21V 29/00*  (2006.01)

(52) U.S. Cl. ............. 353/31; 353/84; 353/52; 353/94; 353/57; 348/748; 362/294; 362/373

(58) Field of Classification Search .......... 353/31, 353/84, 52, 94, 57; 348/748; 362/294, 373
See application file for complete search history.

(56) References Cited

U.S. PATENT DOCUMENTS

| | | | |
|---|---|---|---|
| 3,600,625 A * | 8/1971 | Tsuneta et al. ............ | 313/149 |
| 5,143,444 A * | 9/1992 | Shields ..................... | 362/293 |
| 6,414,703 B1 | 7/2002 | Sugiyama et al. | |
| 2008/0063509 A1 * | 3/2008 | Sutherland et al. ......... | 415/14 |

FOREIGN PATENT DOCUMENTS

| | | |
|---|---|---|
| JP | 04-338794 A | 11/1992 |
| JP | 08-304172 A | 11/1996 |
| JP | 2002-254685 A | 9/2002 |
| JP | 2003-233123 A | 8/2003 |
| JP | 2004-341105 A | 12/2004 |
| JP | 2005-156607 A | 6/2005 |
| JP | 2007-156270 A | 6/2007 |

OTHER PUBLICATIONS

Decision to Grant a Patent (and English translation thereof) issued in counterpart Japanese Application No. 2009-064916.

* cited by examiner

*Primary Examiner* — Georgia Y Epps
*Assistant Examiner* — Magda Cruz
(74) *Attorney, Agent, or Firm* — Holtz, Holtz, Goodman & Chick, PC

(57) ABSTRACT

There are provided a light emitting device which can maintain a light emitting efficiency of a fluorescent material in an optimum condition, a light source unit made up of the light emitting device, and a projector which includes the light source unit. The light source unit is made up of the three light emitting devices which emit lights of different colors. The light emitting devices are each made up of a light source, a rotary member on which a fluorescent material layer is disposed which receives light to emit light of a predetermined color, a drive source for driving the rotary member, a rotational speed control device for variably controlling the rotary member so as to maintain the temperature of the rotary member to a predetermined value based on temperature information, and a temperature measuring device for measuring a temperature of the rotary member.

8 Claims, 6 Drawing Sheets

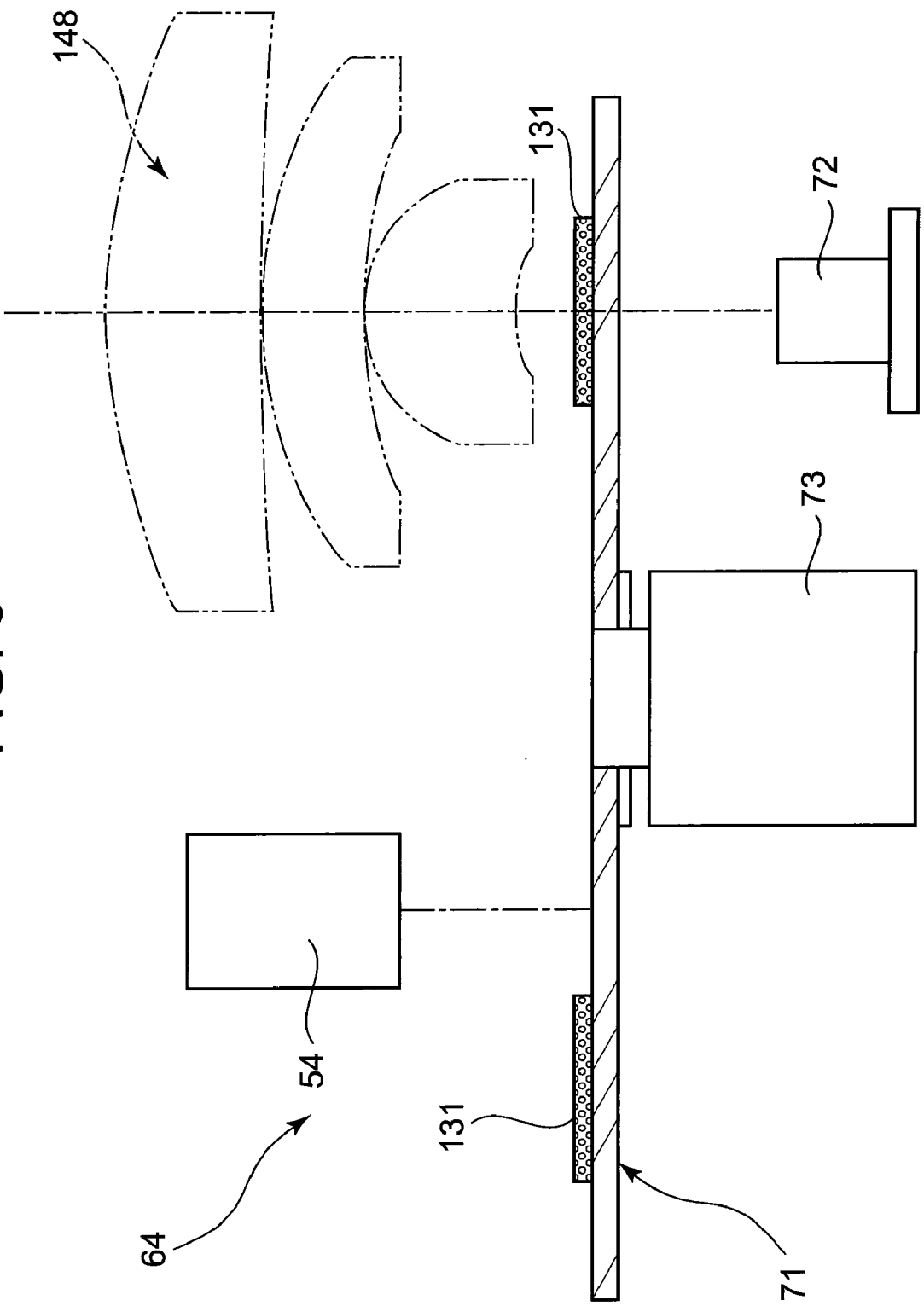

LIGHT EMITTING DEVICE, LIGHT SOURCE UNIT AND PROJECTOR USING SAME LIGHT SOURCE UNIT

CROSS-REFERENCE TO RELATED APPLICATIONS

This application is based upon and claims the benefit of priority under 35 USC 119 of Japanese Patent Application No. 2009-064916 filed on Mar. 17, 2009, the entire disclosure of which, including the description, claims, drawings and abstract, is incorporated herein by reference in its entirety.

BACKGROUND OF THE INVENTION

1. Field of the Invention

The present invention relates to a light emitting device, alight source unit made up of a plurality of such light emitting devices and a projector which incorporates the light source unit.

2. Description of the Related Art

In these days, projectors are used in many cases as image projection apparatuses which project screens or video images of personal computers and further images based on image data stored in memory cards on to a screen. These projectors are such that light emitted from a light source is concentrated on a micromirror device called a DMD (Digital Micromirror Device) or a liquid crystal plate for display of a color image on the screen.

In projectors of the type described above, conventionally, projectors using a high-intensity discharge lamp as a light source have been the mainstream of projectors. In recent years, however, there have been made many proposals on light source units which use a solid-state light emitting device such as a light emitting diode or a laser diode as a light source and fluorescent materials for converting high-output light from the solid-state light emitting device into red, green and blue lights, respectively. For example, Japanese Unexamined Patent Publication No. 2004-341105 proposes a light source unit comprising a light emitting diode as a light source and a rotary member including fluorescent materials for converting ultraviolet light emitted from the light emitting diode into visible light.

According to the proposal by Japanese Unexamined Patent Publication No. 2004-341105, three fluorescent material layers are formed on the rotary member which absorb excited light to thereby emit lights of red, green and blue wavelength areas. By rotating the rotary member, ultraviolet light from the light source is shined sequentially to the fluorescent material layers, whereby lights of red, green and blue wavelength areas can be radiated from the light source unit. However, since shining timings of red, green and blue lights are synchronized with the display device, the rotary member needs to be rotated at a predetermined rotational speed, and there has been a problem that the rotational speed cannot be varied linearly or cannot be varied according to the conditions of the rotary member.

SUMMARY OF THE INVENTION

The present invention has been made in view of the problem inherent in the related art, and an object thereof is to provide a light emitting device in which the temperature of a rotary member can be maintained in its optimum condition for light emitting efficiency of fluorescent materials by controlling a rotational speed of the rotary member according to the temperature thereof, a light source unit made up of a plurality of such light emitting devices and a projector which uses the same light source unit.

The light emitting device of the invention comprises a light source, a rotary member on which a fluorescent material layer is disposed which receives light shined from the light source to emit light of a predetermined wavelength area, a drive source for rotating the rotary member, a rotational speed control means for variably controlling a rotational speed of the rotary member, and a temperature measuring means for measuring a temperature of the rotary member, wherein the rotational speed control means variably controls the rotational speed of the rotary member so as to maintain the temperature of the rotary member to a predetermined value based on temperature information from the temperature measuring means.

BRIEF DESCRIPTION OF THE DRAWINGS

The invention will be understood more sufficiently by reading the following detailed description of the invention and by reference to the accompanying drawings. However, the drawings are mainly for the purpose of better understanding of the invention and are not such as to limit the scope of the invention in any way. In the drawings;

FIG. 6 is an exemplary plan view showing a partially sectional view of a light emitting device according to a modified example of the invention.

DETAILED DESCRIPTION OF THE PREFERRED EMBODIMENT

Figure 1:
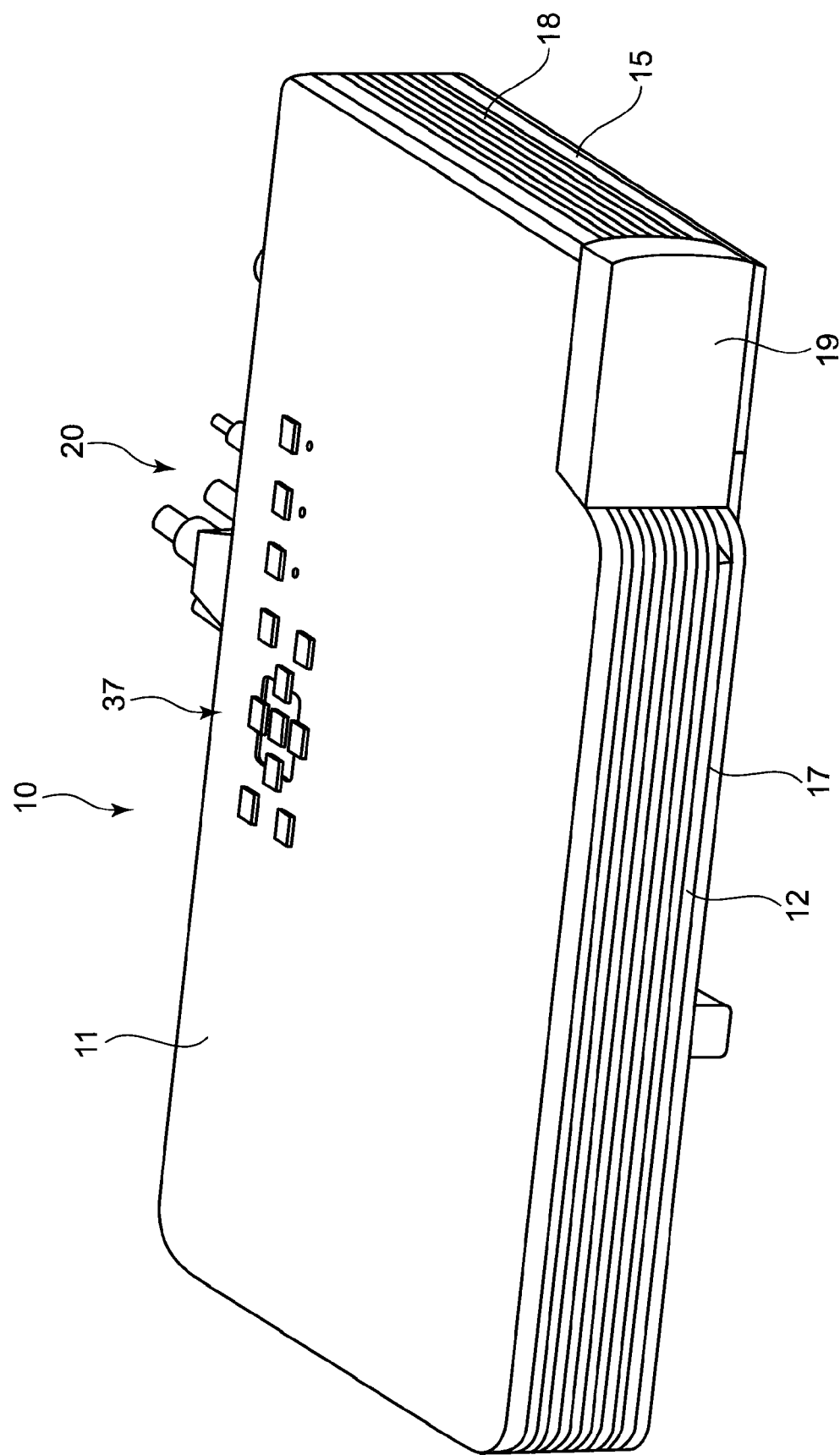
FIG. 1 is a perspective view showing an external appearance of a projector according to an embodiment of the invention.

Hereinafter, a preferred embodiment for carrying out the invention will be described by use of the accompanying drawings. However, in the following embodiment, although various preferred technical limitations will be described as being made for carrying out the invention, the scope of the invention is not limited at all to the following embodiment and illustrated examples.

An embodiment of the invention will be described. A projector 10 includes a light source unit 63, a display device 51, a cooling fan, a light source side optical system 62 for guiding light from the light source unit 63 to the display device 51, a projection side optical system 90 for projecting an image emitted from the display device 51 on to a screen, and a projector control means for controlling the light source unit 63 and the display device 51.

This light source unit 63 includes at least three light emitting devices 64 which emit lights of different wavelength areas and optical axis varying devices which vary optical axes of respective light beams emitted from the different light emitting devices 64 so that directions of the optical axes of the light beams coincide with each other.

Specifically, this light source unit 63 includes the three light emitting devices 64. These three light emitting devices 64 are a red light emitting device 64R in which a fluorescent material layer 131 for emitting a light of red wavelength area is disposed on its rotary member 71, a green light emitting device 64G in which a fluorescent material layer 131 for emitting a light of green wavelength area is disposed on its rotary member 71, and a blue light emitting device 64B in which a fluorescent material layer 131 for emitting a light of blue wavelength area is disposed on its rotary member 71.

In addition, the light emitting device 64 includes a light source 72 which emits light of ultraviolet wavelength area as excited light, the rotary member 71 on which the fluorescent material layer 131 is disposed which receives and absorbs excited light having directivity and shined from the light source 72 to thereby emit light of any of red, green and blue wavelength areas, a wheel motor 73 as a drive source for rotating the rotary member 71, and a radiation thermometer 54 as a temperature measuring means for measuring a temperature of the rotary member 71. Then, a control unit 38 of a projector control means and a rotational speed control means made up of a wheel motor control circuit 55 are designed to variably control the rotational speed of the rotary member 71 so as to maintain the temperature of the rotary member 71 (that is, the temperature of a fluorescent material on the fluorescent material layer 131 disposed on a surface of the rotary member 71) to a predetermined temperature based on temperature information inputted from the radiation thermometer 54.

Specifically, the rotational speed control means stores a high temperature threshold of Ta degrees and a low temperature threshold of Tb degrees as predetermined thresholds regarding temperature. The rotational speed control means compares a temperature measured by the temperature measuring means with the high temperature threshold of Ta degrees, and when the measured temperature is larger than the high temperature threshold of Ta degrees, the rotational speed control means increases the rotational speed of the rotary member 71. In addition, the rotational speed control means compares the temperature measured by the temperature measuring means with the low temperature threshold of Tb degrees, and when the measured temperature is smaller than the low temperature threshold of Tb degrees, the rotational speed control means decreases the rotational speed of the rotary member 71.

Hereinafter, a preferred embodiment of the invention will be described based on the accompanying drawings. FIG. 1 is a perspective view showing an external appearance of a projector 10. When used in this embodiment, left and right denote left and right directions with respect to a projecting direction, and front and rear denote front and rear directions with respect to a traveling direction of a light beam. As is shown in FIG. 1, the projector 10 has a substantially rectangular parallelepiped shape and has a lens cover 19 which covers a projection port which lies to a side of a front panel 12 which is referred to as a front side panel of a main body case, as well as a plurality of outlet holes 17 in the front panel 12. Further, although not shown, the projector 10 includes an Ir reception part for receiving a control signal from a remote controller.

In addition, a keys/indicators part 37 is provided on an upper side panel 11 which constitutes the main body case, and disposed on this keys/indicators part 37 are keys and indicators which include a power supply switch key, a power indicator which informs whether the power supply is on or off, a projection switch key which switches on or off projection, an overheat indicator which informs of an overheat condition when the light source unit, the display device or the control circuit overheats and the like.

Further, provided on a back side or a back side panel of the main body case are an input/output connectors part where USB terminals, an image signal input D-SUB terminal, an S terminal, an RCA terminal and the like are provided and various types of terminals 20 including a power supply adaptor plug and the like. A plurality of inlet holes 18 are formed in proximity to lower portions of a right-hand side panel 14 which constitutes a side panel, not shown, of the main body case and a left-hand side panel 15 which is a side panel shown in FIG. 1.

Figure 2:
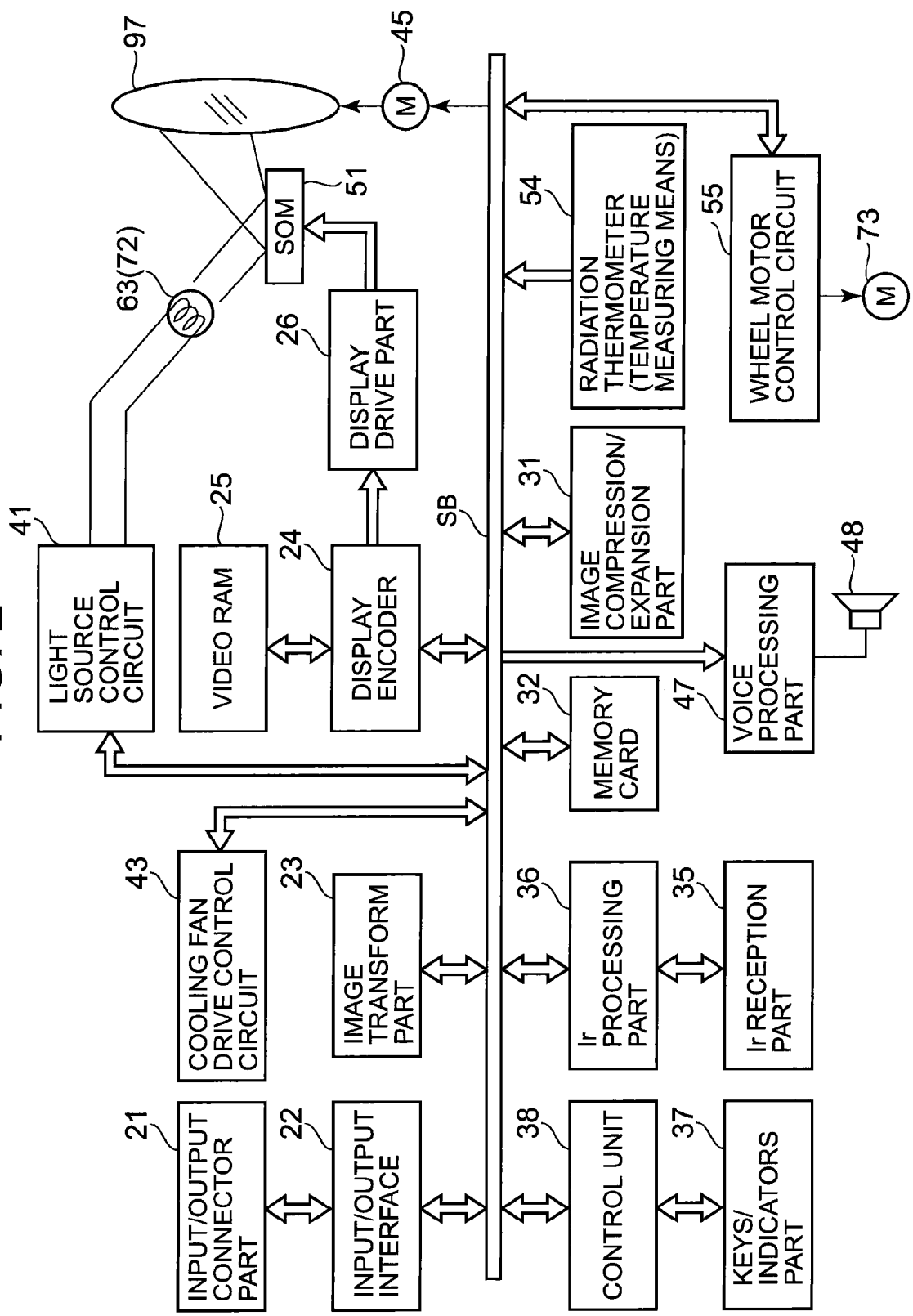
FIG. 2 is a functional circuit block diagram of the projector according to the embodiment of the invention.

Next, a projector control means of the projector 10 will be described by use of the block diagram in FIG. 2. The projector control means is made up of the control unit 38, an input/output interface 22, an image transform part 23, a display encoder 24, a display drive part 26 and the like. Image signals of various standards inputted from an input/output connector part 21 are sent via the input/output interface 22 and a system bus (SB) to the image transform part 23 where the image signals are converted so as to be unified into an image signal of a predetermined format suitable for display and are thereafter outputted to the display encoder 24.

The display encoder 24 deploys the image signal inputted thereinto on a video RAM 25 for storage and generates a video signal from the contents stored in the video RAM 25, outputting the video signal so generated to the display drive part 26.

The display drive part 26 drives a display device 51 which is a spatial optical modulator (SOM) at an appropriate frame rate in accordance with the image signal outputted from the display encoder 24. A light beam emitted from the light source unit 63 is caused to enter the display device 51 via a light source side optical system to thereby form an optical image by reflected light from the display device 51, and the optical image so formed is then projected on to a screen, not shown, for display via a projection system lens group which is referred to as a projection side optical system. A movable lens group 97 of the projection side optical system is driven by a lens motor 45 for zooming or focusing.

An image compression/expansion part 31 performs a recording operation and specifically data compresses an intensity signal and a color-difference signal of the image signal through processings such as ADCT and Huffman coding so as to write them sequentially on a memory card 32 which is referred to as a detachable recording medium. Further, when in a reproducing mode, the image compression/expansion part 31 reads out image data recorded on the memory card 32, expands individual image data which make up a series of time-varying images frame by frame, and outputs the image data to the display encoder 24 via the image transform part 23 so as to enable the display of time-varying images based on the image data stored on the memory card 32.

The control unit 38 is such as to govern operations of respective circuitries within the projector 10 and is made up of a CPU, a ROM which stores in a fixed fashion operation programs of various types of settings and a RAM which is used as a work memory.

Operation signals from the keys/indicators part 37 which is made up of the main keys and indicators provided on the upper side panel 11 of the main body case are sent directly to the control unit 38, while key operation signals from the remote controller are received by the Ir reception part 35, and a code signal demodulated at an Ir processing part 36 is outputted to the control unit 38.

In addition, a voice processing part 47 is connected to the control unit 38 via the system bus (SB). This voice processing part 47 includes a sound source circuit such as a PCM sound source. When in a projection mode and the reproducing mode, the voice processing part 47 converts voice data into analog signals and drives a speaker 48 to output loudly sound or voice based on the voice data.

The control unit 38 causes a light source control circuit 41 to timesharing control respective light sources 72 of light emitting devices which emit lights of red, green and blue wavelength areas and which make up a light source unit 63 according to image signals. Further, the control unit 38 causes a cooling fan drive control circuit 43 to detect temperatures through a plurality of sensors which are provided at the light source unit 63 and the like so as to control the rotational speed of a cooling fan based on the results of the temperature detection. The control unit 38 also causes the cooling fan drive control circuit 43 to make the cooling fan continue to rotate even after the power supply of the projector main body is switched off by use of a timer and controls the power supply to the projector main body to be cut off depending upon the results of the temperature detection by the temperature sensors.

The control unit 38 causes a wheel motor control circuit 55 to variably control wheel motors 73 based on temperature information on respective rotary members of the light emitting devices which is inputted from a radiation thermometer 54 as a temperature control means. Namely, the control unit 38 and the wheel motor control circuit 55 are configured as a rotational speed control means for variably controlling the rotational speeds of the rotary members which are connected to the wheel motors 73. The details of the rotational speed control of the control unit 38 using the wheel motor control circuit 55 will be described later.

These ROM, RAM, ICs and circuit devices are incorporated in a control circuit board 103 which function as a main control circuit, which will be described later, and a power supply circuit block 101, and the control circuit board 103 which functions as the main control circuit board of a control system is formed separately from a light source control circuit board 102 on which the power supply circuit block 101 of a power system is mounted.

Figure 3:
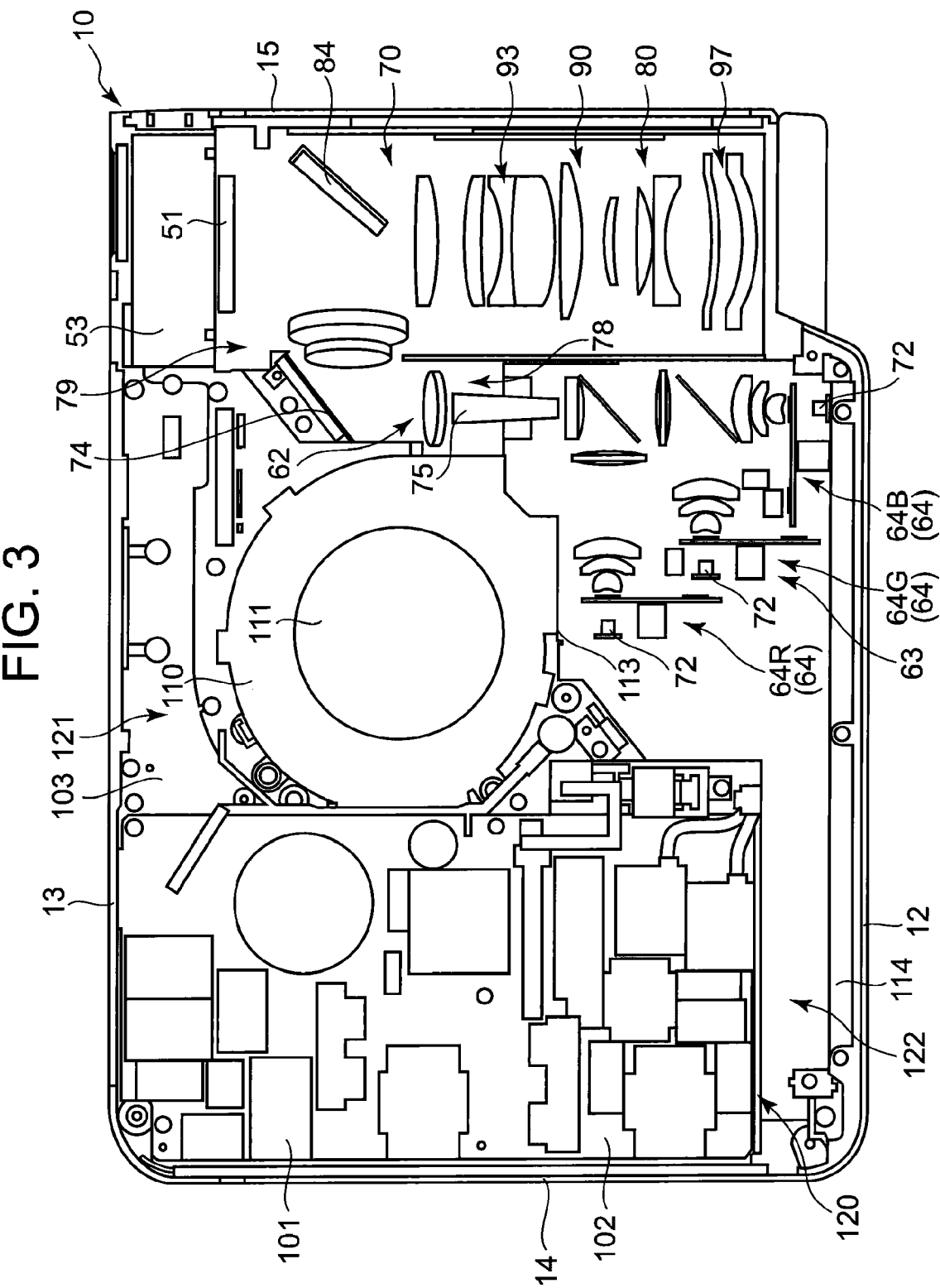
FIG. 3 is an exemplary plan view showing an internal construction of the projector according to the embodiment of the invention.

Next, an internal construction of the projector 10 will be described. FIG. 3 is an exemplary plan view showing an internal construction of the projector 10. As is shown in FIG. 3, in the projector 10, the light source control circuit board 102 on which the power supply circuit block 101 and the like are mounted is disposed in proximity to the right-hand side panel 14, a sirocco fan-type blower 110 is disposed substantially at a center thereof, the control circuit board 103 is disposed in proximity to the blower 110, the light source 63 is disposed in proximity to the front panel 12, and an optical system unit 70 is disposed in proximity to the left-hand side panel 15. In addition, an interior of a housing of the projector 10 is divided airtightly into an inlet side space compartment 121 which lies on the back panel 13 side and an outlet side space compartment 122 which lies on the front panel 12 side by a portioning bulkhead 120. The blower 110 is disposed so that its inlet port 111 is positioned in the inlet side space compartment 121 and its outlet port 113 is positioned on a boundary between the outlet side space compartment 122 and the inlet side space compartment 121.

The optical system unit 70 has a substantially U-shape and is made up of three blocks such as an illumination side block 78 which is positioned in proximity to the light source unit 63, an image generation block 79 which is positioned on the back panel 13 side, and a projection side block 80 which is positioned between the illumination side block 78 and the left-hand side panel 15.

The illumination side block 78 includes part of a light source side optical system 62 for guiding light emitted from the light source unit 63 to the display device 51 which is possessed by the image generation block 79. A light smoothing or light guiding device 75 for making a light beam emitted from the light source unit 63 into a light beam whose intensity is uniformly distributed and a condensing lens for concentrating light that has been transmitted through the light guiding device 75 are included in the light source side optical system 62 that is possessed by the illumination side block 78.

The image generating block 79 has, as the light source side optical system 62, an optical axis varying mirror 74 for varying a direction of an optical axis of the light beam emitted from the light guiding device 75, a plurality of condensing lenses for concentrating light reflected by the optical axis varying mirror 74 on to the display device 51 and a shining mirror 84 for shining the light beam that has been transmitted through the condensing lenses on to the display device 51 at a predetermined angle. Further, the image generating block 79 includes a DMD which is the display device 51, and a display device heatsink or cooling device 53 for cooling the display device 51 is disposed on a back panel 13 side of the display device 51. The display device cooling device 53 prevents the display device 51 from being heated to a high temperature.

The projection side block 80 has a lens group of a projection side optical system 90 which projects light on to the screen, which light is reflected by the display device 51 to form an image. The projection side optical system 90 is referred to as a variable focus lens made up of a fixed lens group 93 which is incorporated in a fixed lens barrel and a movable lens group 97 which is incorporated in a movable lens barrel and having a zooming function, and zooming and focusing can be implemented by moving the movable lens group 97 by a lens motor.

In the internal construction of the projector 10, members whose temperatures are lower than that of the light source unit 63 are disposed within the inlet side space compartment 121. Specifically, disposed in the inlet side space compartment 121 are the light source control circuit board 102, the blower 110, the control circuit board 103, the image generating block 79 of the optical system unit 70, the projection side block 80 of the optical system unit 70, and the condensing lenses of the illumination side block 78 of the optical system unit 70.

On the other hand, disposed within the outlet side space compartment 122 are the light source unit 63 whose temperature is increased to a relatively high temperature, the light guiding device 75 of the illumination side block 78 of the optical system unit 70, and an outlet temperature decreasing device 114.

The light source unit 63 of the invention is made up of three light emitting devices 64 which receive light emitted from the corresponding light sources 72 as excited light and emit lights of different wavelength areas to the light guiding device 75. Specifically, the light source unit 63 is made up of a red light emitting device 64R on which a red fluorescent member layer for emitting a light of red wavelength area is disposed for emitting a light of red wavelength area, a green light emitting device 64G on which a green fluorescent member layer for emitting a light of green wavelength area is disposed for emitting a light of green wavelength area, and a blue light emitting device 64B on which a blue fluorescent member layer for emitting a light of blue wavelength area is disposed for emitting a light of blue wavelength area.

The red light emitting device 64R is disposed in proximity to the outlet port 113 of the blower so that an optical axis of the red light emitting device 64R intersects an optical axis of the light guiding device 75 at right angles. The green light emitting device 64G is disposed closer to the front panel 12 side than the red light emitting device 64R so that an optical axis of the green light emitting device 64G becomes parallel to the optical axis of the red light emitting device 64R. The blue light emitting device 64B is disposed in proximity to the front panel 12 so that an optical axis of the blue light emitting device 645 coincides with the optical axis of the light guiding device 75.

The light emitting devices 64 include the corresponding light sources 72, and respective lights emitted from the light sources 72 are shined on to the fluorescent material layers of the light emitting devices 64 as excited lights, whereby lights of respective colors' wavelength areas are excited from the excited fluorescent materials, respectively, and are then emitted from the light emitting devices 64. These light sources 72 are light emitting diodes or laser oscillators which emit light of violet a shorter wavelength than the lights of red, green and blue wavelength areas or light of ultra violet wavelength area.

When a light emitting diode or laser oscillator is used for the light source 72, by providing a collimator lens on an emerging side of the light emitting diode or laser oscillator, light from the light emitting diode can be emitted as a parallel light having directivity or light from the laser oscillator can be emitted while increasing its directivity. Thus, providing the collimator lens in such a way is preferable since the utilization efficiency of light emitted from the light source 72 can be increased. By adopting the light emitting diode or laser oscillator as the light source 72, compared with a conventional projector which uses a discharge lamp as a light source device, not only can electric power consumption be suppressed but also the light source can be made smaller in size.

The respective light sources 72 do not have to have the same specification, provided that they can emit excited lights which enable the generation of lights of predetermined wavelength areas from their fluorescent material layers. For example, the light sources 72 for the red and green light emitting devices 64R, 64G may be made to emit as excited light a light of blue wavelength area which is shorter in wavelength than red and green wavelength areas. A plurality of types of light sources 72 may be disposed in each light emitting device 64 so that the plurality of types of light sources 72 are switched for use as circumstances require.

Figure 4:
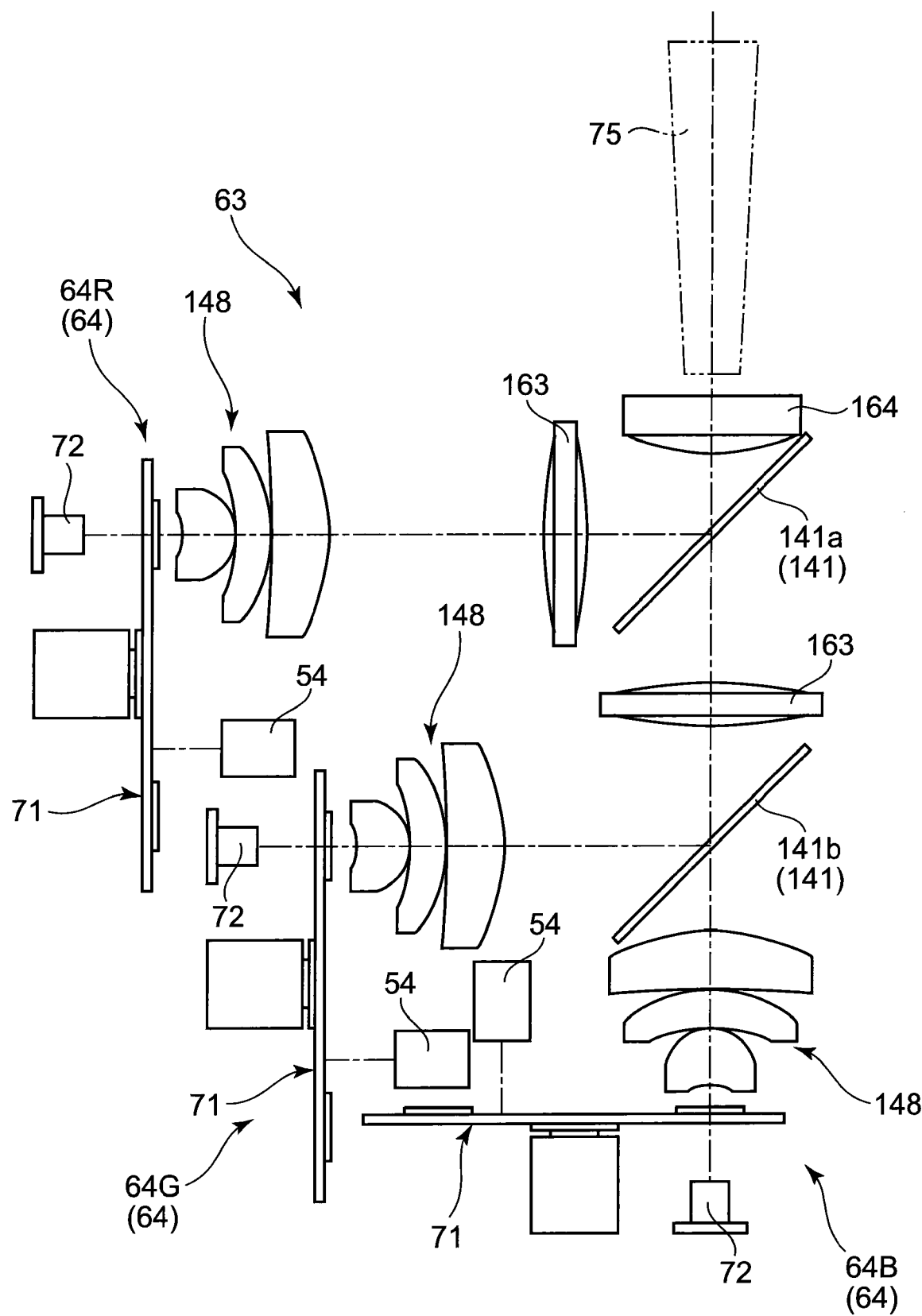
FIG. 4 is an exemplary plan view of a light source unit according to the embodiment of the invention.

As is shown in FIG. 4, the light source unit 63 includes a light condensing optical system which is made up of the three light emitting devices 64 which generates lights of red, green and blue predetermined wavelength areas, which are the three primary colors of light, dichroic mirrors 141 which function as optical axis varying devices for varying directions of optical axes of respective light beams emitted from the light emitting devices 64 so that the directions of the optical axes coincide with one another and lenses.

Although various configurations can be adopted for the light condensing optical system, in this embodiment, the dichroic mirror 141 as the optical axis varying device is disposed in the light emitting direction of each light emitting device 64. Firstly, the direction of the optical axes of light beams from the red and green light emitting devices 64R, 64G are made to coincide with each other. In addition, the optical axes of the light beams from the red and green light emitting devices 64R, 64G are varied or turned through 90 degrees so that the optical axes thereof coincide with the optical axis of the light guiding device 75. Specifically, the first dichroic mirror 141a which reflects red light and transmits lights of other colors is disposed in a position where the optical axes of the red light emitting device 64R and the light guiding device 75 intersect each other at right angles. The second dichroic mirror 141b which reflects green light and transmits lights of other colors is disposed in a position where the optical axes of the green light emitting device 64G and the light guiding device 75 intersect at right angles.

This light condensing optical system includes lens groups 148 as condensing lenses for concentrating and guiding light beams from the respective light emitting devices 64 to the light guiding device 75 and convex lenses 163 and includes further a light guiding device incident lens 164 for condensing red, green and blue light beams to an incident surface of the light guiding device 75.

By configuring the light condensing optical system in the way described above, red light emitted from the red light emitting device 64R is condensed by the lens group 148 so as to be shined on to the convex lens 163, and the light so condensed by the convex lens 163 is reflected on the first dichroic mirror 141a. Thereafter, the light so reflected on the first dichroic mirror 141a is condensed on to the incident surface of the light guiding device 75 by the light guiding device incident lens 164.

In addition, green light emitted from the green light emitting device 64G is condensed by the lens group 148 so as to be incident on the second dichroic mirror 141b and is then reflected on the second dichroic mirror 141b. Thereafter, the light so reflected is concentrated by the convex lens 163 so as to be shined on to the first dichroic mirror 141a, and after the light so shined is transmitted through the first dichroic mirror 141a, the light is then concentrated on to the incident surface of the light guiding device 75 by the light guiding device incident lens 164.

Then, blue light emitted from the blue light emitting device 64B is concentrated by the lens group 148 so as to be shined on to the second dichroic mirror 141b. After the light has been transmitted through the second dichroic mirror 141b, the light is concentrated by the convex lens 163 so as to be shined on to the first dichroic mirror 141a. After the light has been transmitted through the first dichroic mirror 141a, the light is concentrated on to the incident surface of the light guiding device 75 by the light guiding device incident lens 164.

Consequently, since the light sources 72 of the three light emitting devices 64 which make up the light source unit 63 are time sharing controlled by the light source control circuit 41, whereby the light beams of predetermined wavelength areas of the respective colors are caused to be sequentially incident on the light guiding device 75, and the light beams that are incident on the light guiding device 75 are guided to the display device 51 by the light source side optical system 62. By doing so, the display device 51 time sharing displays the lights of respective colors in accordance with shining timings of the respective light sources 72, whereby a color image can be generated on the screen via the projection side optical system 90.

Figure 5:
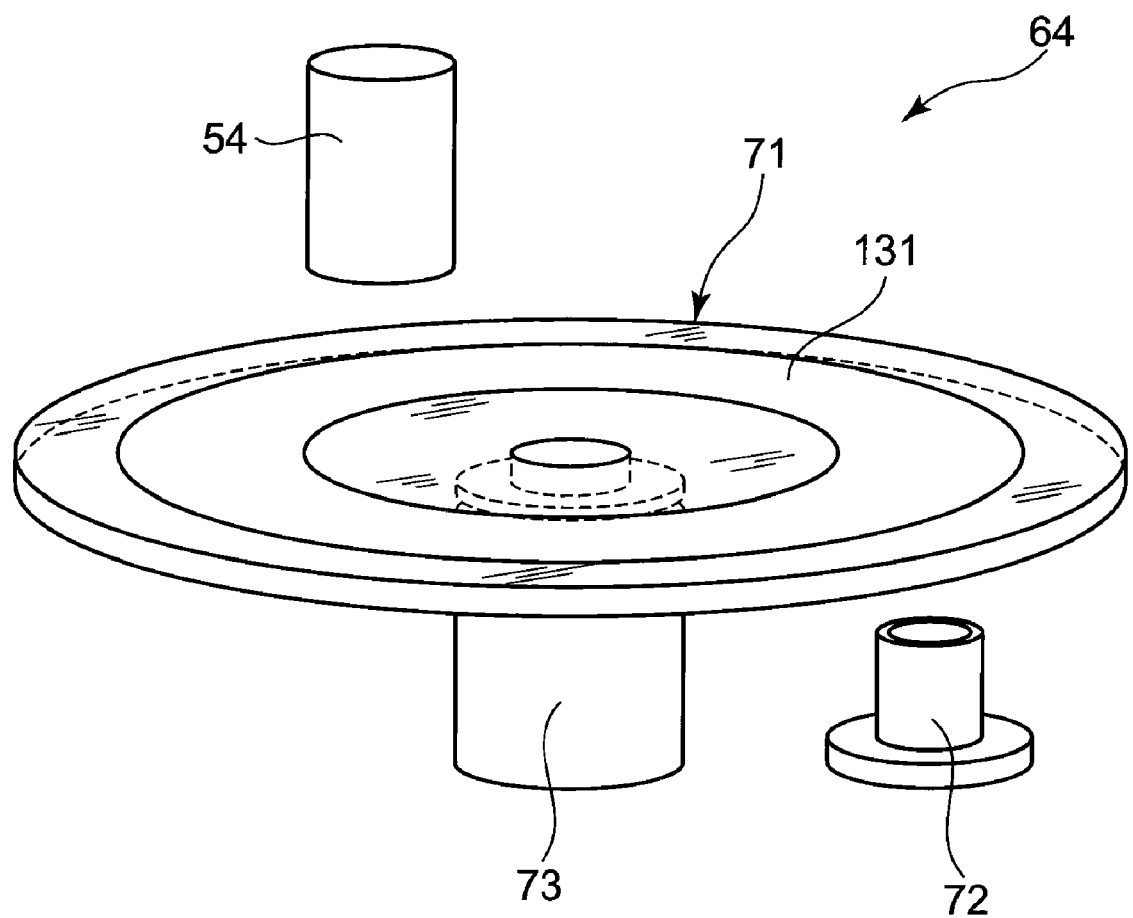
FIG. 5 is a perspective view showing an external appearance of a light emitting device according to the embodiment of the invention.

Next, the constructions of the light emitting devices 64, which are referred to as the red light emitting device 64R, the green light emitting device 64G and the blue light emitting device 64B, will be described. As is shown in FIGS. 5, 6, the light emitting device 64 includes a rotary member 71 which is installed so as to be rotated by a wheel motor 73 which is attached to a central portion of a circular disk-like base material, the wheel motor 73 as a drive source for rotating the rotary member 71 and the light source 72 which emits light on to the fluorescent material layer 131.

The base material of the rotary member 71 is made of a transparent material such as glass or resin having light transmitting properties. The rotary member 71 can be given rigidity by forming the base material of glass. Alternatively, a reduction in weight and cost of the rotary member 71 can be realized by forming the base material of a transparent resin.

In the rotary member 71, a circular opening is formed in a central portion of the base material which matches a shape of a cylindrical rotor which is a connecting portion with the wheel motor 73. The rotor is securely inserted into the circular opening so as to be fixedly bonded to a circular disk-like motor hub provided on the rotor, whereby the rotor is integrated with the wheel motor 73. By doing so, this rotary member 71 is rotated by the wheel motor 73 which is variably controlled by the control unit 38 of the projector control means and the wheel motor control circuit 55, which constitute the rotational speed control means.

The fluorescent material layer 131 having an annular shape is formed on a surface on an opposite side to the light source 72 of the rotary member 71. This fluorescent material layer 131 receives and absorbs light emitted from the light source 72 as excited light to thereby emit light of a predetermined wavelength area. This fluorescent material layer 131 may be formed on a side of the rotary member 71 facing the light source 72.

The fluorescent material layer 131 for red which emits light of red wavelength area, which is one of the primary colors, is secured to the rotary member 71 of the red light emitting device 64R. Similarly, the fluorescent material layer 131 for green which emits light of green wavelength area, which is another of the primary colors, is secured to the rotary member 71 of the green light emitting device 64G. Further, the fluorescent material layer 131 for blue which emits light of blue wavelength area, which is another one of the primary colors, is secured to the rotary member 71 of the blue light emitting device 64B. The fluorescent material layer 131 is made up of a fluorescent material crystal and a binder, and a fluorescent material contained in this fluorescent material layer 131 absorbs excited light to thereby be excited, whereby light of a predetermined wavelength area can be emitted in every orientation.

Consequently, when excited light is shined from the light source 72 to the fluorescent material layer 131 on the rotary member 71, the fluorescent material contained in the fluorescent material layer 131 absorbs the excited light and emits light of a predetermined wavelength area in every orientation. Namely, light of red wavelength area is emitted from the fluorescent material on the red fluorescent material layer 131 of the red light emitting device 64R, light of green wavelength area is emitted from the fluorescent material on the green fluorescent material layer 131 of the green light emitting device 64G, and light of blue wavelength area is emitted from the fluorescent material on the blue fluorescent material layer 131 of the blue light emitting device 64B.

Then, light emitted from the fluorescent material layer 131 towards the lens group 148 side is incident on the light guiding device 75 as such via the light condensing optical system.

Here, in the event that a dichroic layer is formed on the surface of the side of the rotary member 71 where the fluorescent material layer 131 is disposed, the dichroic layer transmitting excited light and reflecting light of other wavelength areas than excited light such as light of wavelength area that is emitted from fluorescent materials, excited light from the light source 72 can be shined on to the fluorescent material layer 131 after having been allowed to pass through the dichroic layer so provided, and additionally, light emitted from the fluorescent material layer 131 to the transparent base material side of the rotary member 71 is reflected towards the light guiding device 75 so as to increase the quantity of light that is incident on the light guiding device 75 can be increased.

In the event that a non-reflecting coat layer is formed on a surface of the opposite side of the rotary member 71 to the side where the fluorescent material layer 131 is disposed, almost all excited light from the light source 72 can be transmitted therethrough without being reflected so as to be incident on the fluorescent material layer 131, whereby the utilization efficiency of exited light emitted from the light source 72 can be increased.

Thus, the light source unit 63 which is incorporated in the projector 10 is made up of the three light emitting devices 64R, 64G, 64B which can emit lights of red, green and blue wavelength areas, and the rotary members 71 of the light emitting devices 64 are rotated and excited lights emitted from the light sources 72 of the light emitting devices 64 are sequentially lit on and off. Then, lights of red, green and blue wavelength areas are sequentially incident on the light guiding device 75 from the rotary members 71. The DMD, which is the display device 51 of the projector 10, time sharing displays individually the lights of respective colors so as to match the shining timings of the respective light sources 72, thereby making it possible to generate a color image on the screen.

The invention is not limited to the configuration in which the respective light emitting devices 64 are designed to be sequentially turned on and off by the projector control means. Hence, the light emitting devices 64 may be combined so as to mix lights of respective colors to thereby be shined on to the light guiding device 75. For example, in the event that red, green and blue lights are emitted simultaneously from the red, green and blue light emitting devices 64R, 64G, 64B, respectively, white light which is formed by mixing the respective colors is shined on to the light guiding device 75 so as to increase intensity. Further, color shade such as formulation of colors can easily be adjusted by extending a time light of a color of low intensity is turned on by changing a turn-on time ratio of red, green and blue lights.

The invention is not limited to the configuration in which the three light emitting devices 64 are configured as the light emitting devices 64 for generating lights of red, green and blue wavelength areas, which are the primary colors of light. Hence, various combinations can be adopted. For example, a light emitting device 64 for generating light of wavelength area of yellow, which is a complementary color, may be incorporated in the light source unit 63. By doing so, the intensity of the light source unit 63 can be increased to realize an increase in color reproducibility.

In the light emitting device 64, since the fluorescent material layer 131 that is disposed on the rotary member 71 is formed into the annular shape, the excited light shining region on the fluorescent material layer 131 can be extended in a circumferential direction by rotating the rotary member 71, thereby making it possible to suppress effectively an increase in temperature of the fluorescent material by exited light being shined thereon. Ambient air surrounding the rotary member 71 is oscillated in a rotational direction of the rotary member 71 due to frictional force generated between the rotary member 71 and molecules of air as the rotary member 71 rotates, and air flows are formed in a radial direction of the rotary member 71. Because of this, as the rotary member 71 rotates, the rotary member 71 is cooled by currents of air, whereby an increase in temperature of the fluorescent material can be suppressed accordingly as the rotational speed of the rotary member 71 is increased. In addition, providing fins on the rotary member 71 can increase the cooling efficiency of the rotary member 71.

Namely, decreasing the rotational speed of the rotary member 71 can increase the temperature of the fluorescent material, whereas increasing the rotational speed of the rotary member 71 can decrease the temperature of the fluorescent material. The light emitting device 64 of the invention is designed to maintain the temperature of the fluorescent material in an optimum condition for the light emitting efficiency at all times by controlling the rotational speed of the rotary member 71. In addition, in the embodiment of the light emitting device 64 of the invention, when in operation, the rotational speed of the rotary member 71 can be controlled in a range from 10 to 7200 rpm. However, the invention is not limited thereto, and hence, the rotational speed may be such as to maintain the temperature of the fluorescent material in the optimum condition for the light emitting efficiency.

As is shown in FIGS. 5, 6, the light emitting device 64 of the invention includes a radiation thermometer 54 as a temperature measuring means. This radiation thermometer 54 is a thermometer for measuring an intensity of infrared light or visible light that is radiated from a predetermined portion of an object to measure a temperature of the predetermined portion of the object. In this embodiment, the radiation thermometer 54 is disposed so as to be able to measure a temperature of a portion of the front surface of the rotary member 71 which lies in proximity to the fluorescent material layer 131. Namely, the light emitting device 64 is such that the temperature of the fluorescent material can be estimated by measuring the surface temperature of the rotary member 71. The radiation thermometer 54 may be disposed so as to measure directly a temperature of the fluorescent material layer 131 as a surface temperature of the rotary member 71, which is formed on the surface of the rotary member 71.

This radiation thermometer 54 is electrically connected to the control circuit of the projector 10. The wheel motor 73 of the light emitting device t64 is variably controlled by the control unit 38 and the wheel motor control circuit 55 which constitute the rotational speed control means. The control unit 38 is designed to send the wheel motor control circuit 55 a signal to change the rotational speed of the wheel motor 73 to a rotational speed corresponding to the temperature of the rotary member 71 (that is, the temperature of the fluorescent material) based on the temperature information inputted from the radiation thermometer 54. The wheel motor control circuit 55 is designed to rotate the wheel motor 73 at the predetermined rotational speed based on the signal inputted which carries the rotational speed information.

Specifically, the control unit 38 has control maps of temperature and rotational speed in advance. For example, in the event that an optimum temperature condition for the light emitting efficiency of the fluorescent material is Ta degrees or lower and Tb degrees or higher, a high temperature threshold is set as Ta degrees and a low temperature threshold as Tb degrees. Then, in the event that the control unit 38 is given control maps of temperature and rotational speed which are designed so that when an inputted measured temperature is higher than Ta degrees, the wheel motor control circuit 55 rotates the wheel motor 73 at a high rotational speed Rh, whereas the inputted measured temperature is lower than Tb degrees, the wheel motor control circuit 55 rotates the wheel motor 73 at a low rotational speed Rl, and the inputted measured temperature is Ta degrees or lower and Tb degrees or higher, the wheel motor circuit 55 rotates the wheel motor 73 at a middle rotational speed Rm, the rotary member 71 is controlled by the rotational control means which operates based on the temperature information from the radiation thermometer 54, which is the temperature control means, whereby the temperature of the rotary member 71 or the fluorescent material is maintained at Ta degrees or lower and Tb degrees or higher.

Thus, by the control unit 38 controlling the rotational speed of the rotary member 71 in accordance with the temperature of the rotary member 71, there can be provided the light emitting device 64 in which the light emitting efficiency of the fluorescent material of the rotary member 71 can be maintained in the optimum condition, the light source unit 63 which is made up of the plurality of light emitting devices 64 and the projector 10 which includes the light source unit 63. Namely, there can be provided the light emitting device 64, the light source 63 and the projector 10 which can ensure the optimum intensity at all times by preventing the reduction in light emitting efficiency attributed to the temperature of the fluorescent material and can maintain the high performance over the long period of time by preventing the deterioration of the fluorescent material with age which occurs as the temperature of the rotary member increases.

In general, fluorescent materials are characterized in that light emitting efficiency is in good shape when temperature is low. Because of this, when the temperature of the rotary member 71 is low, by the rotary member 71 being rotated at low speeds by the rotational speed control means, there can be provided the light emitting device 64, the light source unit 63 and the projector 10 which can realize a reduction in noise level.

The invention is not limited to the configuration in which the two thresholds are set for the light emitting device 64. Instead, a configuration may be adopted in which more than two thresholds are set so that the rotational speed of the rotary member 71 can be changed in a step-like fashion. Alternatively, a configuration may be adopted in which the rotational speed of the rotary member 71 is changed linearly based on the temperature information. By adopting these configurations, the optimum condition can be maintained more easily. Further, a configuration may be adopted in which only one threshold is set for the light emitting device 64, so that in the event that the measured temperature is larger than the threshold, the rotational speed of the rotary member 71 is increased more than when in steady state operation so as to cool down the fluorescent material. In addition, a configuration may also be adopted in which only one threshold is set for the light emitting device 64, so that in the event that the measured temperature is smaller than the threshold, the rotational speed of the rotary member 71 is decreased more than when in the steady state operation, so that not only can the adjustment of temperature of the fluorescent material be realized but also a reduction in noise level can be realized. In addition, a configuration may be adopted in which a rotational speed control means is provided separately from the control circuit of the projector 10 for each light emitting device 64, and the temperature measuring means are connected individually with the corresponding rotational speed control means.

The invention is not limited to the embodiment that has been described heretofore but can be modified or improved variously without departing from the spirit and scope of the invention. For example, an optical material which gives a diffusion effect to emitted light of a certain wavelength area may be disposed as a diffusion layer on the rotary member 71 of the blue light emitting device 64B of the plurality of light emitting devices 64 which make up the light source unit 63 in place of the fluorescent material layer 131.

Then, the blue light emitting device 64B is provided as including as its light source 72 a light emitting diode or a laser oscillator for emitting light of blue wavelength area, whereby by blue light having directivity which is emitted from the light source 72 being diffused by the diffusion layer for emission, the light of blue wavelength area can be used as such. As the diffusion layer, in addition to securing a solid material which is an optical substance to the surface of the rotary member 71, an optical treatment such as a roughening treatment by blasting may be applied to the surface of the rotary member 71 to form a diffusion layer.

In this way, since the light emitting device 64 in question can be used as a light source of a single color by diffusing the light emitted from the light source 72, the quantity of relatively expensive fluorescent material used can be reduced. Thus, the light source unit 63 and the projector 10 including the light source unit 63 can be provided inexpensively. In addition, the diffusion layer can be maintained in an optimum temperature condition, thereby making it possible to maintain the utilization efficiency of diffused light.

There may be an occasion in which the transparent base material is not used for the rotary member 71 but a non-transparent base material such as copper or aluminum having high heat conductivity is used. As this occurs, the light source 72 is disposed on an emerging surface side of the light emitting device 64. In addition, in the event that an reflection layer by silver deposition is formed on the surface of the side of the rotary member 71 where the fluorescent material layer 131 is formed, light emitted from the fluorescent material layer 131 towards the rotary member 71 side is reflected by the reflection layer so as to be emitted towards the light guiding device 75 side. By doing so, when light from the light source 72 is shined on to the fluorescent material layer 131, since emitted light from the fluorescent material layer 131 can be made to be incident on the light guiding device 75 via the optical system made up of the dichroic mirror or the like, a color image can be generated on the screen in the same way as described above.

The light emitting device includes the rotational speed control means for variably controlling the rotational speed of the rotary member and the temperature measuring means for measuring the temperature of the rotary member, whereby the rotational speed control means can variably control the rotational speed of the rotary member so as to maintain the temperature of the rotary member to the predetermined value based on the temperature information sent from the temperature measuring means. Consequently, by controlling the rotational speed of the rotary member in accordance with the temperature thereof, there can be provided the light source device in which the temperature of the rotary member can be maintained in the optimum condition for the light emitting efficiency of the fluorescent material, the light source unit made up of the plurality of light source device and the projector including the light source unit.

In addition to this, the invention is not limited to the embodiment which has been described heretofore but can be modified variously without departing from the spirit and scope thereof in a stage where the invention is carried out. Additionally, the functions that are put into practice in the embodiment may be combined as much as possible as required when carrying out the invention. Various stages are included in the embodiment described above, and by combining the plurality of constituent elements disclosed as required, various inventions can be extracted. For example, even in the event that some constituent elements are deleted from all the constituent elements described in the embodiment, as long as it can remain advantageous, the resulting configuration from which those constituent elements are deleted can be extracted as an invention.

What is claimed is:

1. A light source unit comprising:
   three light emitting devices in which light emitting diodes or laser oscillators are used as light sources thereof, wherein the three light emitting devices include: (i) a light emitting device in which a fluorescent material layer is disposed on a rotary member which emits light of red wavelength area, (ii) a light emitting device in which a fluorescent material layer is disposed on a rotary member which emits light of green wavelength area, and (iii) a light emitting device in which a fluorescent material layer is disposed on a rotary member which emits light of blue wavelength area; and
   an optical axis varying device for varying directions of optical axes of respective light beams emitted from the light emitting devices so as to coincide with one another;
   wherein at least one of the three light emitting devices comprises:
      the light source;
      the rotary member on which the fluorescent material layer is disposed which emits the light of its respective wavelength area by receiving light that is shined thereto from the light source;
      a drive source for rotating the rotary member;
      means for measuring a temperature of the rotary member; and
      means for variably controlling a rotational speed of the rotary member so as to maintain a temperature of the rotary member to a predetermined value based on measured temperature information.

2. The light source unit according to claim 1, wherein the means for variably controlling the rotational speed stores a predetermined threshold regarding temperature, compares a measured temperature with the threshold, and increases the rotational speed of the rotary member when the measured temperature is larger than the threshold.

3. The light source unit according to claim 1, wherein the means for variably controlling the rotational speed stores a predetermined threshold regarding temperature, compares a measured temperature with the threshold, and decreases the rotational speed of the rotary member when the measured temperature is smaller than the threshold.

4. A projector comprising:
   the light source unit according to claim 1;
   a display device;
   a cooling fan;
   a light source side optical system for guiding light from the light source unit to the display device;
   a projection side optical system for projecting an image emitted from the display device onto a screen; and
   means for controlling the light source unit and the display device.

5. A light source unit comprising:
   at least three light emitting devices for emitting lights of different wavelength areas; and
   an optical axis varying device for varying directions of optical axes of respective light beams emitted from the light emitting devices so as to coincide with one another;
   wherein each of the three light emitting devices comprises:
      a light source;
      a rotary member;
      a drive source for rotating the rotary member;
      means for measuring a temperature of the rotary member; and
      means for variably controlling a rotational speed of the rotary member so as to maintain a temperature of the rotary member to a predetermined value based on measured temperature information;
   wherein the three light emitting devices include:
      a first light emitting device in which a fluorescent material layer is disposed on the rotary member thereof which emits light of red wavelength area by receiving light that is shined thereto from the light source;

a second light emitting device in which a fluorescent material layer is disposed on the rotary member thereof which emits light of green wavelength area by receiving light that is shined thereto from the light source; and a third light emitting device in which a diffusion layer for diffusing light is disposed on the rotary member thereof, the light source of the third light emitting device emitting light of blue wavelength area to the diffusion layer.

6. The light source unit according to claim 5, wherein the means for variably controlling the rotational speed of the rotary member stores a predetermined threshold regarding temperature, compares a measured temperature with the threshold, and increases the rotational speed of the rotary member when the measured temperature is larger than the threshold.

7. The light source unit according to claim 5, wherein the means for variably controlling the rotational speed of the rotary member stores a predetermined threshold regarding temperature, compares a measured temperature with the threshold, and decreases the rotational speed of the rotary member when the measured temperature is smaller than the threshold.

8. A projector comprising:

the light source unit according to claim 5;

a display device;

a cooling fan;

a light source side optical system for guiding light from the light source unit to the display device;

a projection side optical system for projecting an image emitted from the display device onto a screen; and means for controlling the light source unit and the display device.

* * * * *